United States Patent [19]
Takami et al.

[11] Patent Number: 5,638,479
[45] Date of Patent: Jun. 10, 1997

[54] OPTICAL PART

[75] Inventors: Manabu Takami, Machida; Noboru Akazawa, Sagamihara; Atsunori Matsuda, Tsukuba; Yoshihiro Matsuno, Tsukuba; Shinya Katayama, Tsukuba; Toshio Tsuno, Tsukuba, all of Japan

[73] Assignee: Nippon Sheet Glass Co., Ltd., Doshomachi, Japan

[21] Appl. No.: 810,347

[22] Filed: Dec. 17, 1991

Related U.S. Application Data

[63] Continuation of Ser. No. 713,971, Jun. 11, 1991, abandoned, which is a continuation of Ser. No. 381,060, Jul. 17, 1989, abandoned.

[30] Foreign Application Priority Data

| Jul. 19, 1988 | [JP] | Japan | 63-179397 |
| Nov. 30, 1988 | [JP] | Japan | 63-302600 |
| Dec. 9, 1988 | [JP] | Japan | 63-311449 |

[51] Int. Cl.$^6$ .................... G02B 6/02; G02B 6/18
[52] U.S. Cl. .................................................. 385/124
[58] Field of Search ........................ 385/19, 120, 124, 385/147, 17, 8; 250/229; 359/54, 341, 629, 639, 245

[56] References Cited

U.S. PATENT DOCUMENTS

| 4,385,799 | 5/1983 | Soref | 385/17 |
| 4,694,218 | 9/1987 | Chao | 428/428 |
| 4,820,013 | 4/1989 | Fuse | 385/88 |
| 4,904,525 | 2/1990 | Taniguchi et al. | 428/447 |
| 5,185,824 | 2/1993 | Grims et al. | 385/19 |
| 5,371,817 | 12/1994 | Revelli, Jr. et al. | 385/44 |
| 5,418,871 | 5/1995 | Revelli, Jr. et al. | 385/44 |
| 5,493,440 | 2/1996 | Souda et al. | 359/341 |

Primary Examiner—Akm E. Ullah
Attorney, Agent, or Firm—Jones, Day, Reavis & Pogue

[57] ABSTRACT

The optical parts according to the invention have a feature of having smoothly coated surfaces for incident and emergent lights covered thereover with a light transmitting solid coating layer, and can be manufactured by a simplified process at least without needing polishing, together with the advantages of being weatherproof in atmosphere of high temperature and high humidity and antiozonant.

11 Claims, 9 Drawing Sheets

OPTICAL PART

This is a continuation of application Ser. No. 07/713,571 filed on Jun. 11, 1991 now abandoned, which is a continuation of application Ser. No. 07/381,060 filed on Jul. 17, 189, now abandoned.

BACKGROUND OF THE INVENTION

1. Field of the Invention

This invention relates to optical parts with surfaces for incident and emergent light.

2. Description of the Prior Art

In the art, optical parts such as lenses and prisms can be made generally through steps as of grinding, lapping, polishing, and finally smoothing as mirror surface.

In the following will be given the description by an example of manufacturing process of a gradient index lens array unit.

As shown in FIG. 1, a lens array unit 1 is constructed of a pair of upper and lower opposed plates 3, a pair of lateral oppossed spacers 4 (these being made of glass fiber-reinforced plastic (FRP), and a lens array surrounded and held by them. The lens array is composed of a number of glass rod lenses 2 arranged parallel in their optical axes and in at least one row, and each adjoining to other. In addition, gaps in the unit are filled with an adhesive 5 of black silicon resin, or the like, to be firmly bonded to each other into an integrated unit.

Each rod lens 2 has a distribution of refractive index that even viewed in the cross-section, it decrease parabolically from maximum value in the center axis towards the pheriphery. Even if the ends (planes for incident and emerging light) are parallel, they have the same image-forming effect as the usual spherical lens.

The process of manufacturing the lens array unit 1 involves first a number of suitable prolonged glass rod made by the ion-exchange technique, and arranged in such way as closed to each other. Prolonged holding plates 3 are mounted on the upper and lower sides of the arrangement so as to hold it between them and spacers 4 were bilaterally mounted to assemble a long parent 10 of lens array unit as shown in FIG. 2A.

Subsequently, the resultant parent 10 of lens array unit is cut into a number of rod lens units 1 of a predetermined length with a diamond wheel cutter 6.

A plurality of lens array units 1 are piled vertically with respect to the lens rods, as shown in FIG. 2B, and held with a holder 7 and the lens ends are ground roughly with diamond pellets in a both-face lapping apparatus 8.

After finish grinding with lapping abrasive, polishing is made with polishing agent of free abrasive such as zirconia to impart the mirror surface smoothness.

The lens array units manufactured as described above have short focus and besides permit wide image as compared with the spherical lens system in the prior art. They therefore are used in optical systems for photocopying machine, photoprinter, etc. much contributing to compacting them.

As such an example, an LED photoprinter is schematically diagrammed in FIG. 3, in which reference characters designate as follows: 11 a photosensitive drum, 12 a charger, 13 an exposed head, 14 a developing device, 15 a transferring device, 16 a fixing unit, 17 a paper cassette and 18 a paper stacker.

The exposure head 13 incorporates a high density LED array and a lens array for condensing light on the peripheral surface of the drum 11. The LED emits light in accordance with electric signals sent in sequence to the exposure head 13 to form the electrostatic latent image on the drum 11, onto which toner is deposited, and then transferred to a paper.

Electrophotographic recording system including the exemplified LED photoprinter are provided with a charger for use in charging the photosensitive drum.

In the prior art optical device mentioned above however there are differences in workability among the rod lenses 2 of glass and the structural components 3, 4 and 5 surrounding them, which is made of different resins, this resulting in more rapid polishing of resins than glass by the effect of free abrasive. Conjointly with the influence of the elasticity of the polishing cloth, therefore, the end of the rod lens unit 1 can be polished with the result of irregularities between the end of the lens 2 projected and the area around it depressed as shown in FIG. 4, and this affects with deviation in image distance and occurrence of astigmatism.

There are additional encountered difficulties, for example, of requiring many steps of cutting, rough grinding, lapping, and finish polishing, and high cost of abrasive and others.

In addition, the high voltage charger of the LED photoprinter shown in FIG. 3 is responsible, by the electrical discharge from it, for production of much ozone ($O_3$) from oxygen in the air. The ozone can react with water content in the air to produce nitric acid, which corrodes the surface of glass lens of the lens array, and in turn a reaction product with alkali metal contained in the lens glass separates, leading to making the lens surface cloudy and in turn reducing the optical performance.

A countermeasure against this is known which is to bake the lens array itself at about 200° C. to previously separate alkali on the lens surface. This treatment alone however can effect not enough to prevent the deterioration.

SUMMARY OF THE INVENTION

The optical parts according to the invention has a feature of having a solid transparent coating applied to the rough surface directly resulting from cutting or grinding, so as to fill the irregularities thus to obtain smooth surface as desired, conjointly with effect of omitting polishing with free abrasive as finishing.

If the refractive index of the coated material is substantially equal to that of the optical device, the coating-filled surface functions as in the case of a smoothly-polished surface, without diffuse reflection from there, which is due to the surface irregularities, that is, incident light advancing straightly through there. This permits omission of polishing without deteriorating the optical performance.

According to the invention, the shape formed by the cutting or grinding with the fixed abrasive remained unaffected in accuracy thereof. For this reason, particularly the gradient index lens array unit, lens surface of which are flat, has a reduced aberration as compared with aberration coming from irregularities of surface remaining as polished. This permits omission of polishing or grinding/polishing, and the associated great reduction of cost for lens working.

Besides lens array units can be ground with minimized waste, and this contributes to greatly improved yield from raw materials.

Additional advantages are improvement in weatherproofness resulting from the insulation of the surface of the glass lens with effect to protect it against ozone and moisture, and that the coating can bond strongly to and is difficult to peel from the cut surface of the lens unit having small irregularities compared with the smoothly-polished surface.

Besides according to the invention is used a coating containing a compound as an ingredient, in which one alkoxide group (OR) of metal alkoxide is replaced with an organic group (R) inactive on hydrolysis and polycondensation, and hence the coating layer to be obtained has an increased flexibility, which permits formation of a sufficiently thick coating film to fill the irregularities of the unpolished or rough surface of the lens array unit as substrate. Thus it is possible for the surface to be worked to a smoothness as good as replaceable with mirror polishing.

Thus polishing, or grinding and polishing can be omitted and as a result processing cost can be much reduced.

Since the coating layer functions as protective layer for the optical part as substrate, the thus-coated optical part having the associated smooth surface can be used in a high reliability.

Besides, according to the present invention, a coating layer $TiO_2$—$SiO_2$ is provided on the surfaces for incident and emergent lights by the sol-gel technique.

The coating layer, if provide, functions to prevent salts of alkali metals from separating, resulting in much-reduced lowering in the optical performance in ozone atmosphere. This implies that a certain optical performance can be maintained for a long term also in an apparatus such as, electrophotographic copying machine or LED photoprinter, which operates while producing much ozone in the interior of it owing to application of high voltage.

Since the coating layer according to the invention can be formed at low temperatures by the sol-gel process, the formation of it on the lens unit surfaces can be accomplished following assembly of lens array unit, even if the holding plates, spacers and adhesive of organic resins are used except the lenses of glass, without damaging the resinous materials. The coating process therefore can be performed at a single step and suitable for the manufacture of large quantities.

DETAILED DESCRIPTION OF THE PREFERRED EMBODIMENTS

Figure 1:
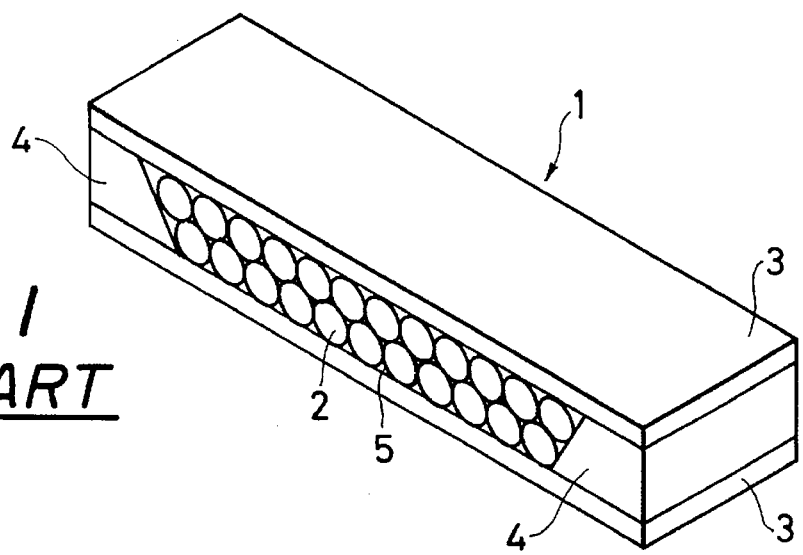
FIG. 1 is a perspective view of a lens array unit as an optical part in the prior art.
Figure 2A:
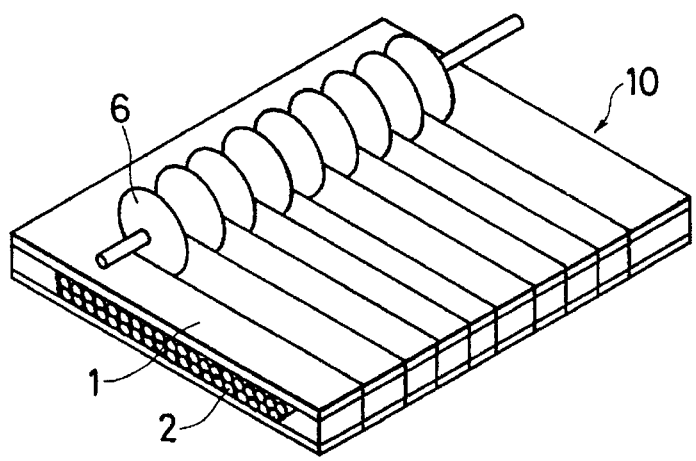
FIG. 2A is a perspective view illustrative of cutting a parent product into the lens array units.
Figure 2B:
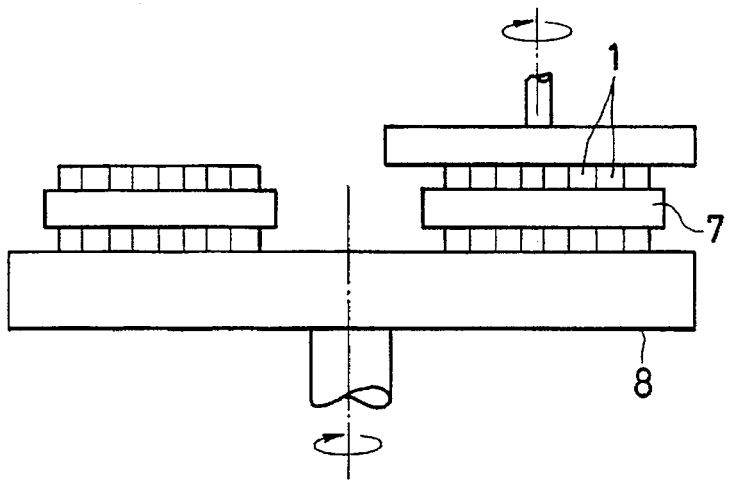
FIG. 2B is a side view schematically illustrating grinding and polishing of the lens array units in the prior art.
Figure 3:
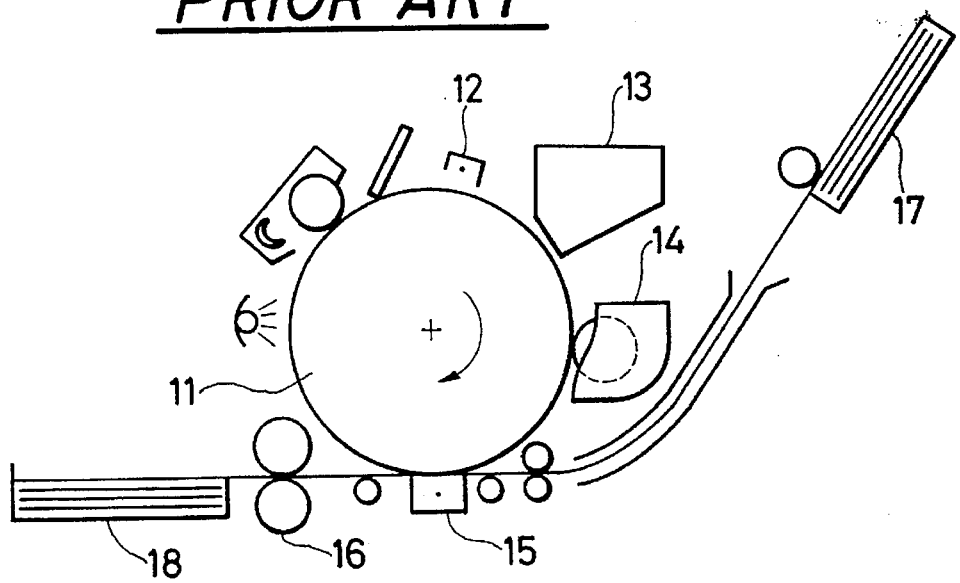
FIG. 3 is a schematic diagram illustrative of the construction of an LED photoprinter with the lens array unit.
Figure 4:
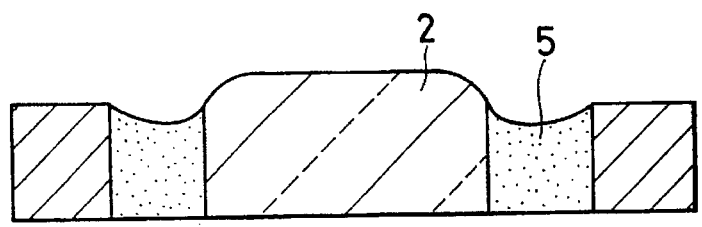
FIG. 4 is a cross-sectional view of the lens end polished in the prior art and, as the result, having irregularities.
Figure 5:
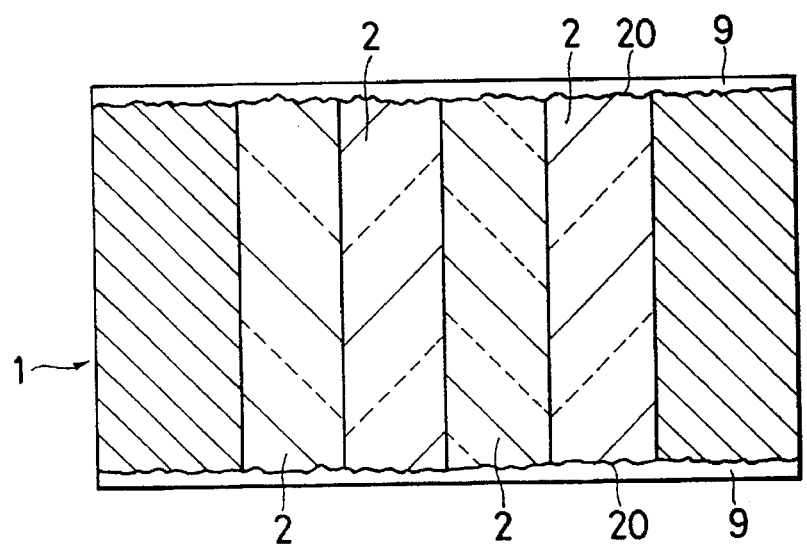
FIG. 5 is a sectional view of the end of the lens array unit, showing the construction of the surfaces with irregularities and a coating applied to them.

In FIG. 5, reference character 20 designates the surface of one of the lens array units 1 into which their parent long assembly 10 is cut by the diamond wheel cutter 6 previously shown in FIG. 2A.

As shown, both ends (for incident and emergent lights) of the rod lens 2 of the unit 1 have each a surface 20 with fine irregularities.

The height of the surface irregularities depends on the particle size of abrasive. The irregularities of the surface cut by diamond wheel measure generally about 0.5 to 5 μm in height, and irregularities within this range are preferred from the aspect of being easy to be obtained.

Figure 6:
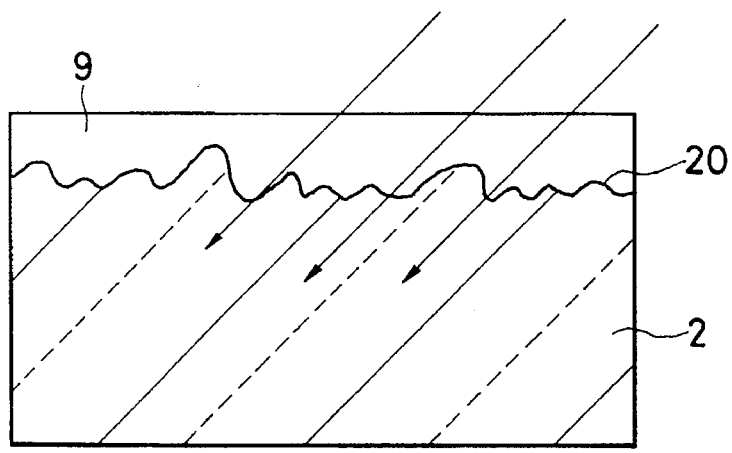
FIG. 6 is an enlarged view of a part of FIG. 5.

After the cutting mentioned above, a coating 9 of solid transparent material is applied to the surface 20 with irregularities at least enough thickness to fill the irregularities, instead of grinding and polishing, as shown in FIG. 6 to an enlarged scale, thus to provide new smooth surface.

Suitable for use in the coating 9 are acrylic and epoxy synthetic resins, such as thermosetting silicon hard coatings, UV-setting resins, cold-setting two-part system epoxy resins and light-setting epoxy acrylate; and inorganic materials such as sol-gel glasses; and so on.

The coating can be applied to a substrate in a known process, for example, by immersion in a liquid of it or by spraying it, and then may be hardened by heating, ultraviolet radiation (for UV resin), or the like.

Transparent coating layer 9 may not be always necessary to be applied except to the end of the lens 2. Taking efficiency of working into consideration, the lens array unit 1 is advantageous in applying coating 9 overall to the end of the unit including holding plates 3, spacer 4 and filler-adhesive 5.

The following experiments were performed for assessing the effects of the present invention.

Figure 7A:
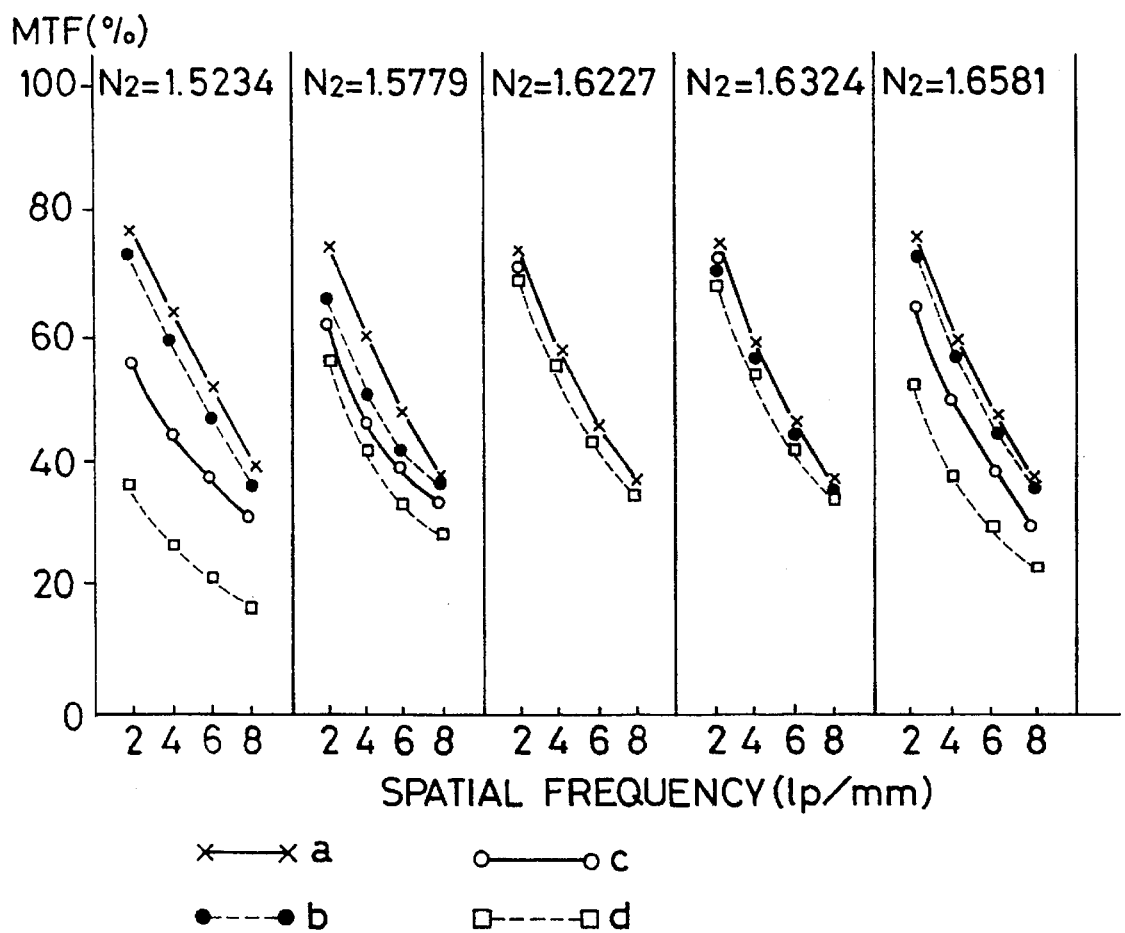
FIGS. 7A through 7C give various characteristics of the measured resolving power of the lens array unit against the refractive index of the coating.
Figure 7B:
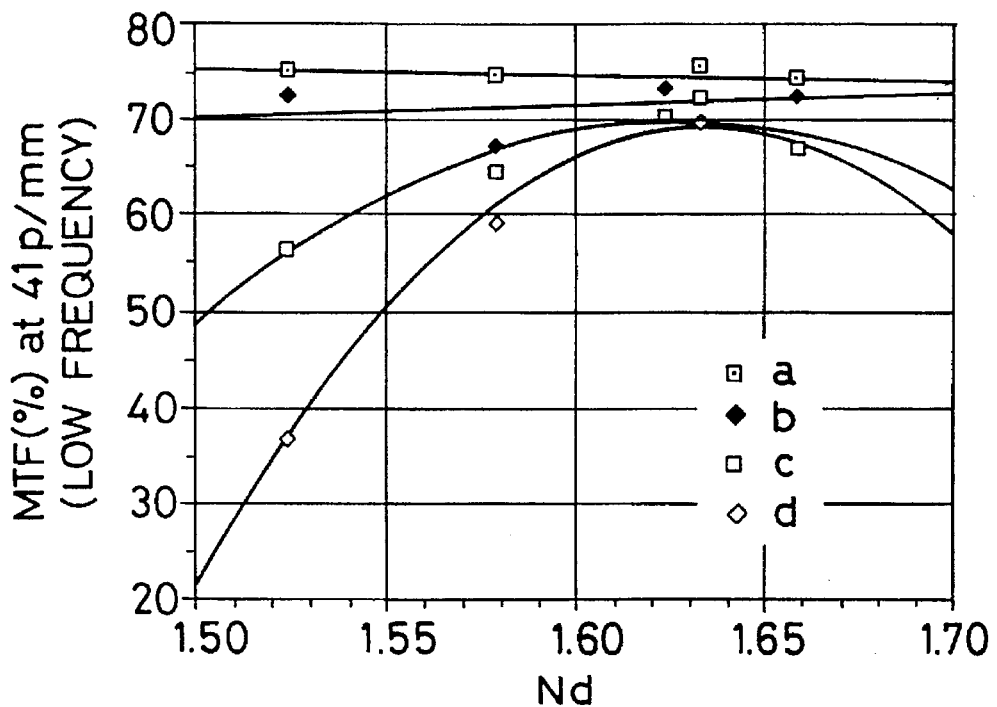
Figure 7C:
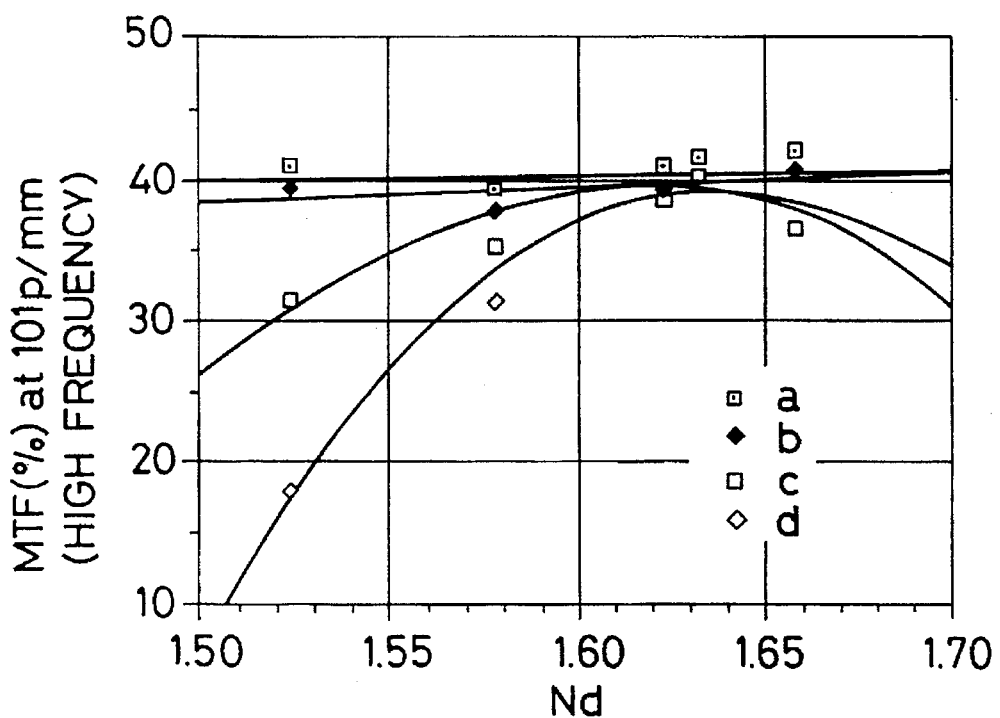

Rod lenses 2 of angular aperture 20°, center refractive index 1.639, peripheral refractive index 1.614 were manufactured, and the ends for incident and emergent lights of it were ground and polished to different surface irregularities. Then the optical performance was measured while immersing the end in matching oils having different refractive indices. The results were plotted in FIGS. 7A through 7C, in which $N_2$'s are the refractive indices of the matching oils, respectively.

In graphs, curve "a" is of polished surface of $R_{max}$ (R:roughness)=0.1 μm or less, "b" is of surface ground with abrasive (JIS particle size No. 600) of $R_{max}$=0.8 μm, "c" is of surface ground with abrasive (JIS particle size No. 400) of $R_{max}=2.2$ μm, and "d" is of surface ground with abrasive (JIS particle size No. 325) of $R_{max}=3.2$ μm.

As understood from the figures, optical performance as good as the polished article can be realized either in the range (average value ±0.025) of the refractive index $N_2$ of the coating layer 9 between the surrounding refractive index and the center refractive index of the lens or in the range of $R_{max}$ of the lens surface not exceeding 1 μm. Also if the refractive index of the coating 9 is an average value among the center refractive index and the surrounding refractive index of the lens, improvement may be expected in resolving power at high frequency band compared with the polished device.

Figure 8A:
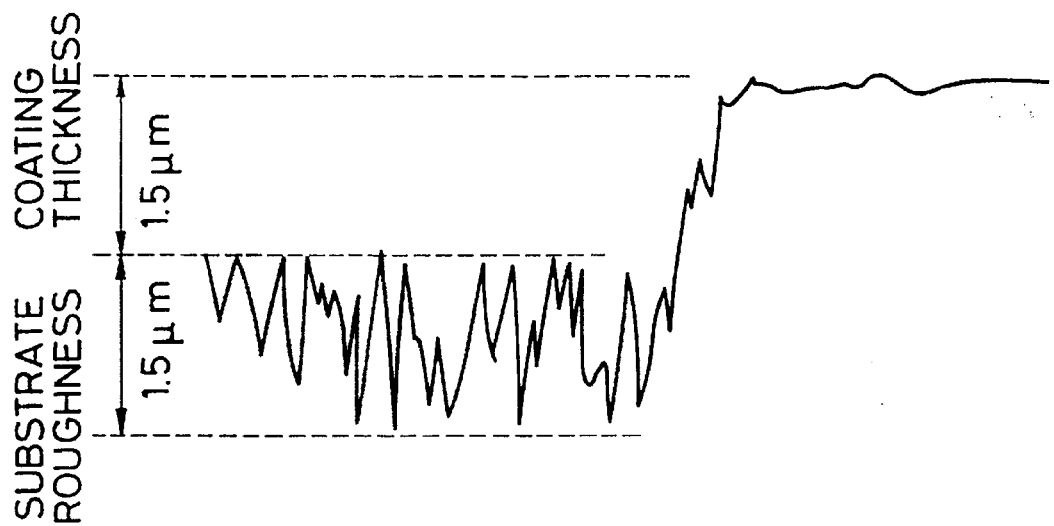
FIG. 8A is a cross-sectional view of the lens substrate and the coating.
Figure 8B:
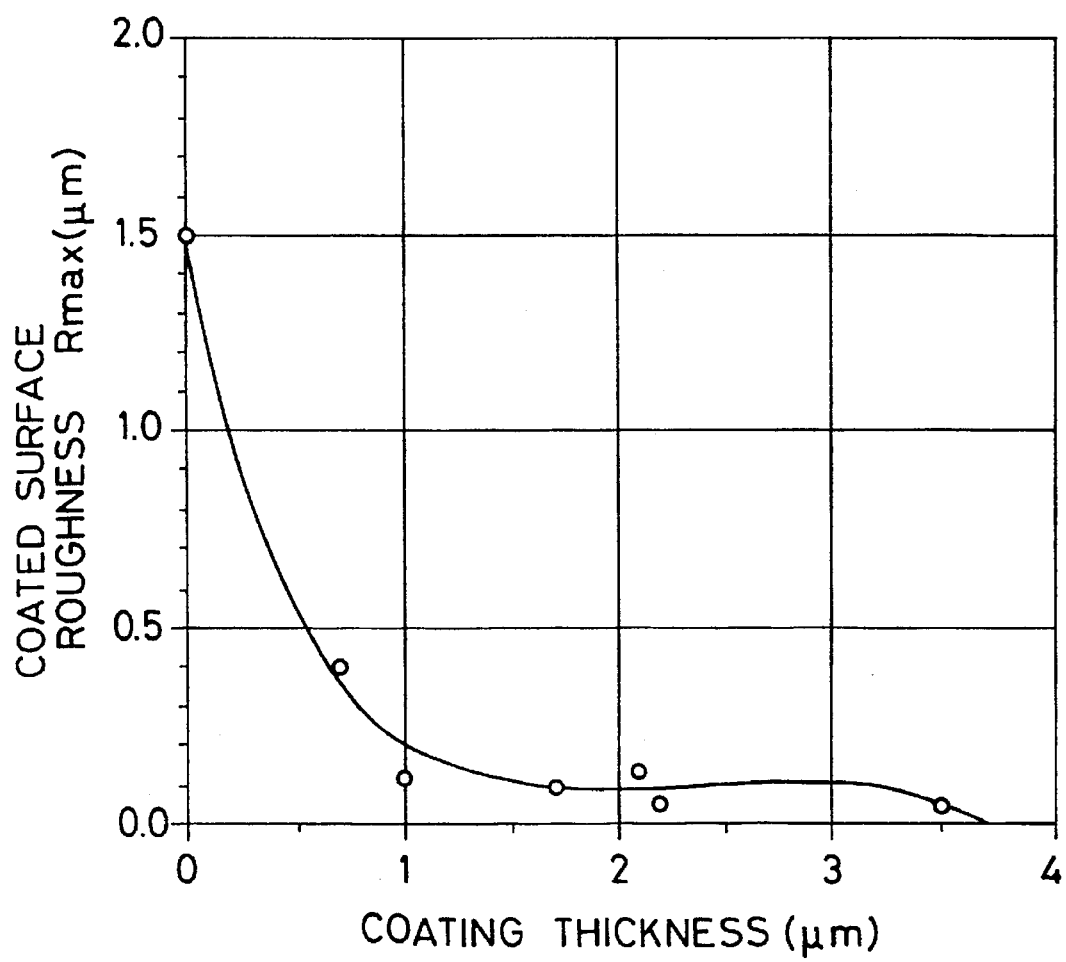
FIG. 8B is as graph showing the relationship between the thickness of the coating and the irregularities of the surface.

FIGS. 8A and 8B show the relationship between the thickness and the irregularities of the coating layer 9 formed on the substrate of $R_{max}=1.5$ μm. As apparent from FIG. 8B, for setting the $R_{max}$ to up to 0.1 μm, which prevents deterioration of optical performance, the coating layer 9 is necessary to have the same thickness of 1.5 μm as the irregularities of the substrate.

Figure 9:
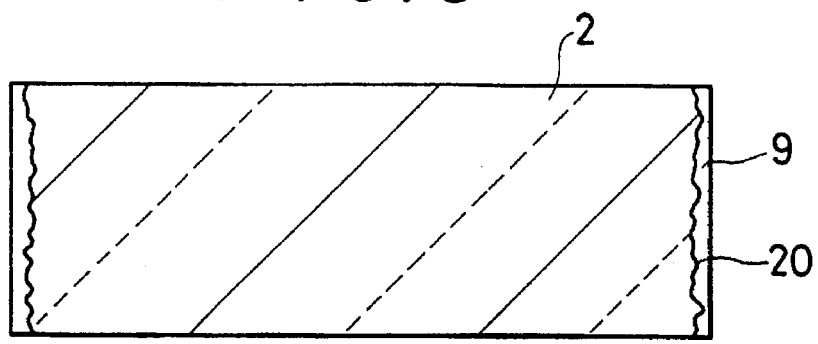
FIG. 9 is a sectional view of a gradient index lens array embodying the present invention.

The present invention is described above by the example of lens array unit 1, and it is a matter of course to apply that to a single rod lens 2 as illustrated in FIG. 9.

Figures 10A, 10B:
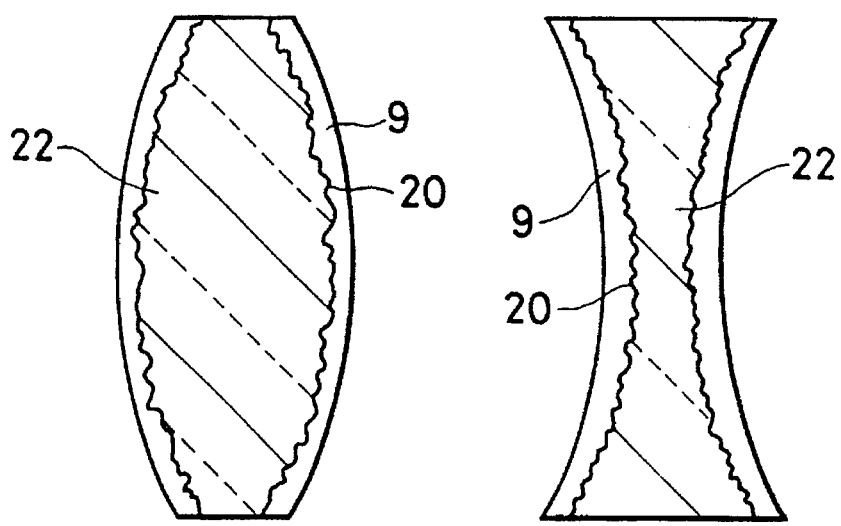
FIG. 10A is a sectional view of a spherical lens embodying the present invention.
FIG. 10B is a sectional view of a spherical lens embodying the present invention.

It can be applied to spherical lens 22 (as illustrated in FIG. 10) as well as to the gradient index lens array.

Besides suitable selection of the irregularities of the lens material and the refractive index of the coating permits adjustment of scattering of light against the interface between the lens and the coating, and this enables to manufacture a soft focus lens having intendedly-worsed low frequency characteristic.

Figure 11:
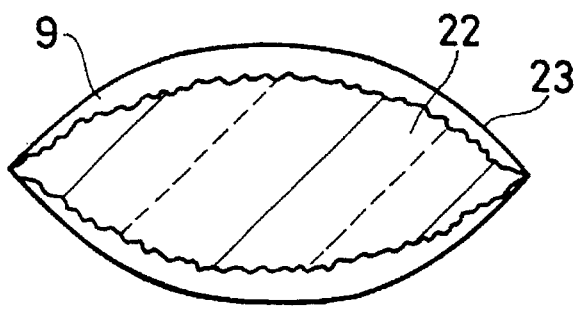
FIG. 11 is a sectional view of an aspherical lens embodying the present invention.

As illustrated in FIG. 11, it also is possible that a glass material is ground into a spherical lens 22, and then provided with resinous coating 9 by molding with an aspherical metal mold finally to form into a corresponding aspherical lens 23.

This method, owing to the low thermal limitation compared with the press-molding of glass with an aspherical metal mold, permits simplified manufacture and easy realization of high accuracy. The lens can be used with poor deterioration in thermal performance compared with the method of molding lens of resin alone.

Besides there can be provided a mount frame around the lens on molding.

In addition the original object of taking the place of polishing, the coating 9 according to the invention can be provided with various functions by the use of transparently-colored resin, heatproof resin, conductive resin, or the like.

Suitable materials of the coating 9 are hydrolysis-polycondensation products of organometallic compound represented by formula $R_1M_1(OR_2)_m$ wherein $R_1$ and $R_2$ are organic radicals having 1 to 6 carbon atoms, $M_1$ is a metal and m is a natural number.

Suitable materials for use in manufacturing optical parts are any solid of plastic, glass, light transmitting ceramic, etc. Particularly inorganic materials of glass, ceramics etc. can be used with great effects. In the present invention, the irregularities of the non-polished surface to be provided with coating are preferred to be $R_{max}$ 2 μm or less, and center line average roughness $R_a$ 0.2 μm or less. If the irregularities exceeds these values, it is difficult to obtain new surface of complete smoothness.

Preferred range of thickness of the coating to be applied is from 0.5 to 10 μm. The thicknesses of the coating of up to 0.5 μm may result in inadequate smoothing by the coating while coating to thicknesses exceeding 10 μm is difficult to be formed by a single operation, and requires to repeat coating operation, which reflects increased steps of process.

The reason that $R_1M_1(OR_2)_m$ was selected as raw material, which is a substitution product of $M_1(OR_2)_{m+1}$ (generally called metal alkoxide and used as raw material in the sol-gel film-forming technique) by the replacement of one of alkoxide groups ($OR_2$ group) of it with an inactive organic group ($R_1$) on the hydrolysis and polycondensation, is that it allows increase of the degree of flexibility of hydrolysis-polycondensation product from this raw material, and as a result enables the formation of enough thick coating to smooth the non-polished surface with irregularities by applying a transparent coating layer.

Suitable metals as $M_1$ of the above-mentioned metal organic compounds are such as Si, Ti, Ta, Nb, Zr, Al, Sn, Sb, and B. As organic radicals $R_1$ and $R_2$ are suitable alkyl, acyl, phenyl, etc.

Coating for use in the present invention, which is a hydrolysis-polycondensation product of a metal organic compounds, is required to be as transparent as the optical part substrate. The refractive index of the baked composite layer is preferable to be identical substantially (within ±0.1) with the refractive index of the optical part substrate, this contributing to reduced reflection of light by the interface between the substrate and coating.

For obtaining more appropriate refractive index of the coating and hardness, etc., it is preferred to use a composite polycondensation product by the addition of one or more kinds $R_3M_2(OR_4)_l$ or $M_3(OR_3)_n$ to $R_1M_1(OR_2)m$, compared with the use of the latter alone. In these formulae, $R_3$, $R_4$ and $R_5$ are organic radicals having up to 6 carbon atoms, respectively, $M_2$ and $M_3$ are metals, and l and n are natural numbers.

The coating according to the invention is preferred to be baked to accelerate the polycondensation and to evaporate volatile constituents such as solvent.

The baking temperature may be set to any temperature not causing lowering of the characteristic of the optical part substrate, and preferred to be within an range between 70° and 400° C. taking the characteristics such as the hardness of the baked coating and the bonding strength to the optical part substrate into consideration.

At baking temperatures of up to 70° C., water content tends to stay in the coating layer, and hence it is difficult to become sufficiently hard. At baking temperatures exceeding 400° C., there is an tendency of the coating to peel from the optical part substrate.

In the following, an example of coating according to the present invention will be described. Methyltriethoxysilane [$CH_3Si(OCH_2H_5)_3$] was added to ethanol in a molar ratio of 1 to 2 and then well blended. To the solution, a diluted hydrochloric acid (3% by weight) was added and hydrolysis was made with stirring at room temperature for 20 minutes.

In this case, amount of water added was 1 in molar ratio to methyltriethoxysilane.

Subsequently, titaniumtetra-n-butoxide [$Ti(On-Bu)_4$] was added, and stirred for further 20 minutes. Then the same diluted hydrochloric acid was further added so that the amount of water added was 1 in molar ratio to methyltriethoxysilane (sum of the first and second addition of water: 2), and stirred for further 20 minutes. Thus a coating solution was obtained.

The composition of this solution was adjusted so that the molar ratio of Si to Ti of the final baked product of oxide was 4 to 1. As above-mentioned, the first addition of water was only 1 in molar ratio to methyltriethoxysilane because, when the first addition of water was made in 2 molar ratio to a uniform solution of ethanol and methyltriethoxysilane (1 to 2 in molar ratio), white cloudy precipitate of fine particles was produced in the solution.

Second addition of water (1 in molar ratio to methyltriethoxysilane; sum of both additions: 2 in molar ratio) after adding titaniumtetra-n-butoxide, was added because of improving in wetting property of the sol in the coating solution to the optical part substrate. Actually, with a coating solution not processed as above-mentioned, it may be repelled by the optical part substrate, resulting in ununiform coating layer. Following the addition of titaniumtetra-n-butoxide, the second addition of water so that the sum of first and second additions was 2 in molar ratio produced no white cloud of fine particles because probably the reaction of methyltriethoxysilane with titaniumtetra-n-butoxide, in the presence of small amount of water by the first addition of it, into inorganic chain-structure high molecules having Ti—O—Si bond to a certain degree in size occurred, and by virtue of this, sudden production of fine particles could not occur by the second addition of water.

Figure 12:
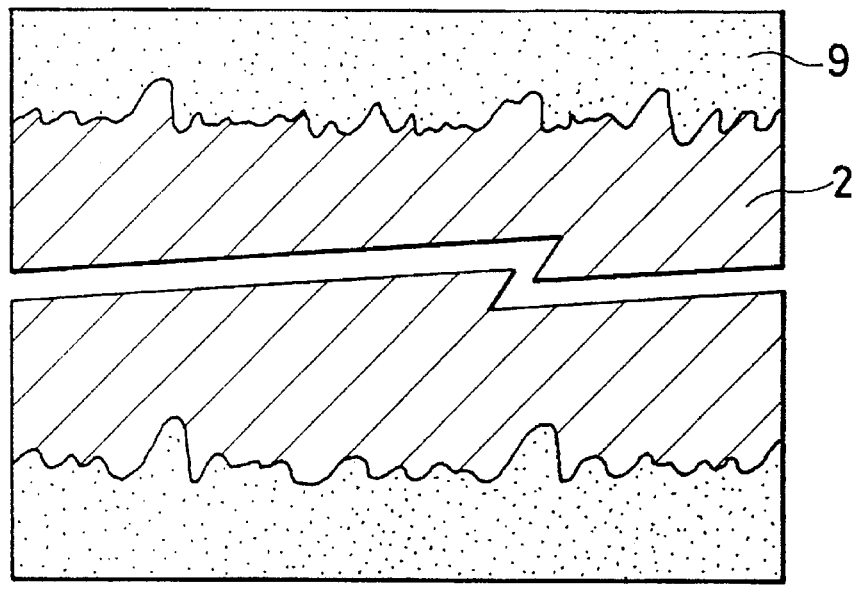
FIG. 12 is a fragmentary sectional view of an optical part embodying the present invention drawn to an enlarged scale.

The thus-prepared coating solution was applied to the surface of an optical part substrate 2 to form a coating layer 9 on it, as shown in FIG. 12.

As substrate 2, a gradient index lens array of which ends for incident and emergent lights have a $R_{max}$ of about 0.5 μm, respectively, was used, and the coating solution was applied to them.

Application to the coating was performed by the so-called dip coating technique comprising immersing a lens in a coating solution and withdrawing at a fixed rate.

After coating, the lens with coating layer 9 was dried at room temperature and subjected to such heat treatment as heated to 140° C. at a temperature rising rate of 1° C. per minute and then kept at this temperature for 30 minutes.

One time of the above-mentioned procedure can form a coating layer 9 of thickness of 2.2 μm having a refractive index of 1.47, with new surface having a reduced $R_{max}$ of up to 0.1 μm and thus as smooth as the mirror surface, and increased resolving power.

The coating layer 9 had a good bonding strength of pencil test hardness 4 H or more.

The manufactured glass lens with coating layer was subjected to weatherproofness test.

For comparison, also uncoated glass lenses were subjected to weatherproofness test. The test was made under conditions: 70° C., relative humidity 90% and keeping time 100 hours.

After weatherproofness test, the uncoated lens was observed to undergo a deterioration called yellowing on the surface. On the other hand, the surface of the optical part with coating layer 9 was noted to have remain unchanged compared with that before test. Neither deterioration nor alkari reaction product was observed.

It therefore has been proved that the coating layer layer 9 constitutes the smooth surface film over the unpolished optical part substrate, and in addition functions as protective layer for it.

In the same procedure as the embodiment of the present invention, glass lenses with the coating layer 9 were subjected baking at 100°, 200° and 350° C., respectively, and evaluation was made similarly.

The obtained results revealed that any of bakings at 100°, 200° and 350° C. effected the same optical characteristics and weatherproofness.

The composition of $TiO_2$—$SiO_2$ coating according to the present invention is not limited to the above-mentioned $TiO_2$ to $SiO_2$ ratio of 20 to 80, and can be changed to any ratio in accordance with the optical property of the optical part substrate.

In the embodiment of the present invention, as an above-mentioned compound which is a substitution product of $M(OR')_{n+1}$ by the replacement of one of alkoxide groups (OR') of it with an inactive organic radical (R) on the hydrolysis-polycondensation was used methyltriethoxysilane $[CH_3Si(OCH_2H_5)_4]$. Instead of this, phenyltrimethoxysilane $[C_6H_5Si(OCH_3)_3]$ or hexyltrimethoxysilane $[C_6H_{13}Si(OCH_3)_3]$ can be used.

For the purpose of setting the refractive index as desired, titanium tetraisopropoxide $[Ti(OC_3H_7)_4]$, titanium acetylacetonato complex $[Ti(OC_4H_9)_2(C_5H_7O_2)_2]$, or the like can be used in the place of titanium tetra-n-butoxide $[Ti(O_nB_u)_4]$ in the embodiment.

Besides, organometallic compounds containing such as Zr or Sn instead of Ti can be used with formation of good coating layer over an optical part substrate.

The conception of the present invention can be applied not only to gradient index lens array but also as a matter of course to spherical lens, prism and so on.

In the following a different coating prepared with a metal alkoxide of silicon tetraethoxide $[Si(OC_2H_5)_4]$ as raw material of it will be described as an comparative example to that according to the invention.

To an ethanol solution of silicon tetraethoxide, a diluted hydrochloric acid (1% by weight) was added and stirred for 1 hour. In this case, the amount of water in the diluted hydrochloric acid was set to 6 in molar ratio to the silicon tetraethoxide. The added amount of ethanol was varied in accordance with the thickness of the coating layer to be formed. The thus-prepared solution was colorless, transparent and used as a coating solution.

This solution was applied to the non-polished surface ($R_{max}$=0.5 μm) of a gradient index lens array to form coating film over the surface as in Example above-mentioned.

Figure 13:
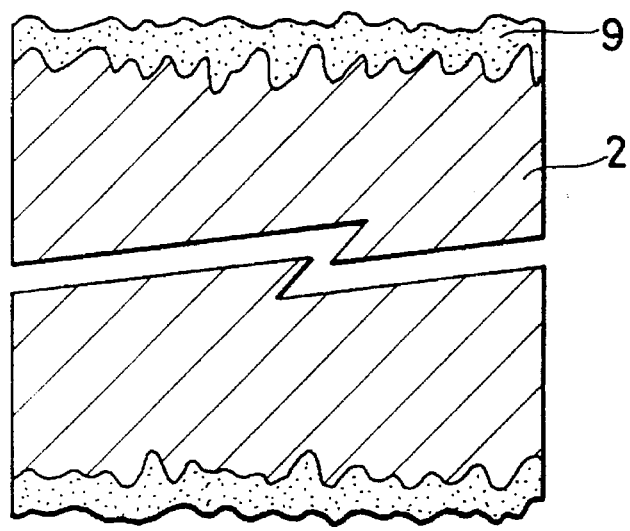
FIG. 13 and FIG. 14 are enlarged sectional views illustrative of difficulties with coating layers in the prior art.

In this comparative example, a single coating can form only small coating thickness up to 0.4 μm thus to make a still unsmooth surface with somewhat irregularities corresponding the unpolished surface, as shown in FIG. 13. In addition, owing to being impossible to set the refractive index as desired, the reflectance by the interface between the coating layer 9 and the optical substrate (lens) 2 become increased.

Figure 14:
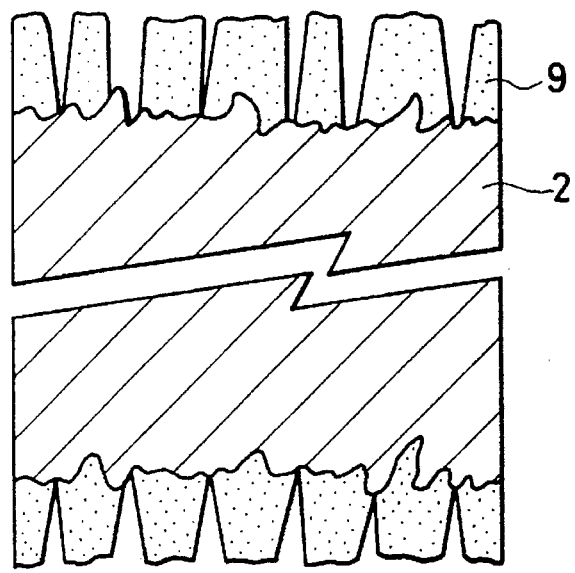

Trial to form larger thicknesses of the coating 9 failed with the result of causing the coating layer 9 to become cracked as shown in FIG. 14.

The description of an alternative Example is given in the following.

Figure 15:
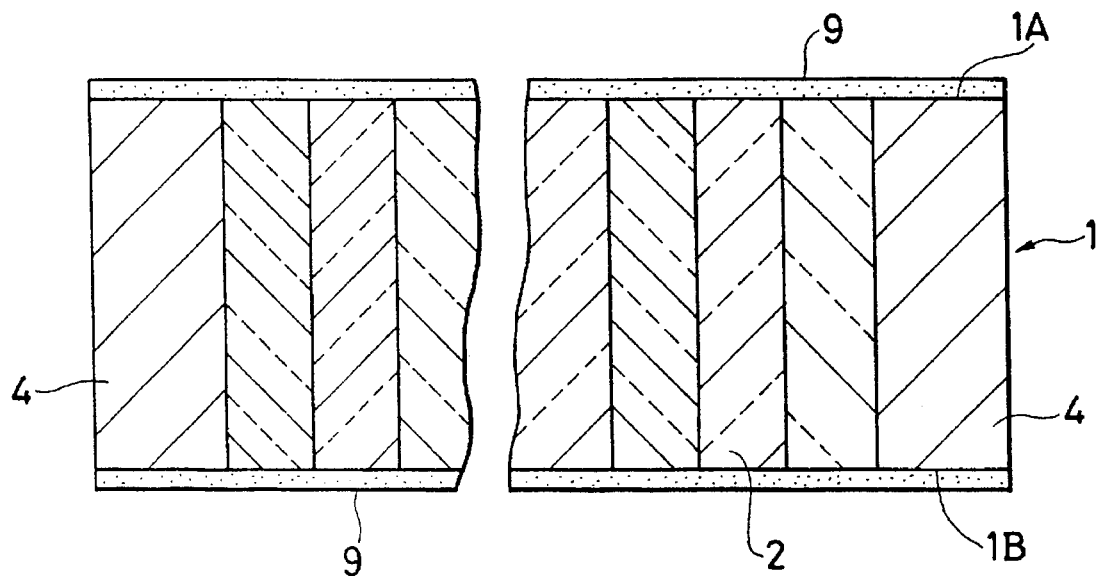
FIG. 15 is a side view of an alternative embodiment of the present invention.

FIG. 15 shows the ends 1A and 1B of the lens array unit 1 each with a transparent coating layer 9 of $TiO_2$—$SiO_2$ formed by the sol-gel process using titanium tetra-n-butoxide and silicon tetraethoxide as starting materials.

As an example, ethanol (42 g) was added to silicon tetraethoxide (38 g) and stirred. Then 3% (by weight) diluted hydrochloric acid (13 g) was dropped and well stirred to make hydrolysis of the compound. The obtained solution was called "solution A".

Besides ethanol (17 g) was added to titanium n-butoxide (6 g), and stirred to make "solution B".

Subsequently solution B was dropped to solution A with violent agitation, and "solution C" was obtained as the reaction product.

The solution C was diluted with ethanol and in this dilution a previously-assembled lens array unit 1 was immersed.

After being withdrawn from the solution, the lens array unit 1 was subjected to baking at 200° C. for 2 hours.

In the above-mentioned process, a coating layer 9 represented as $9TiO_2.91SiO_2$ (in mole %) was formed.

Figure 16A:
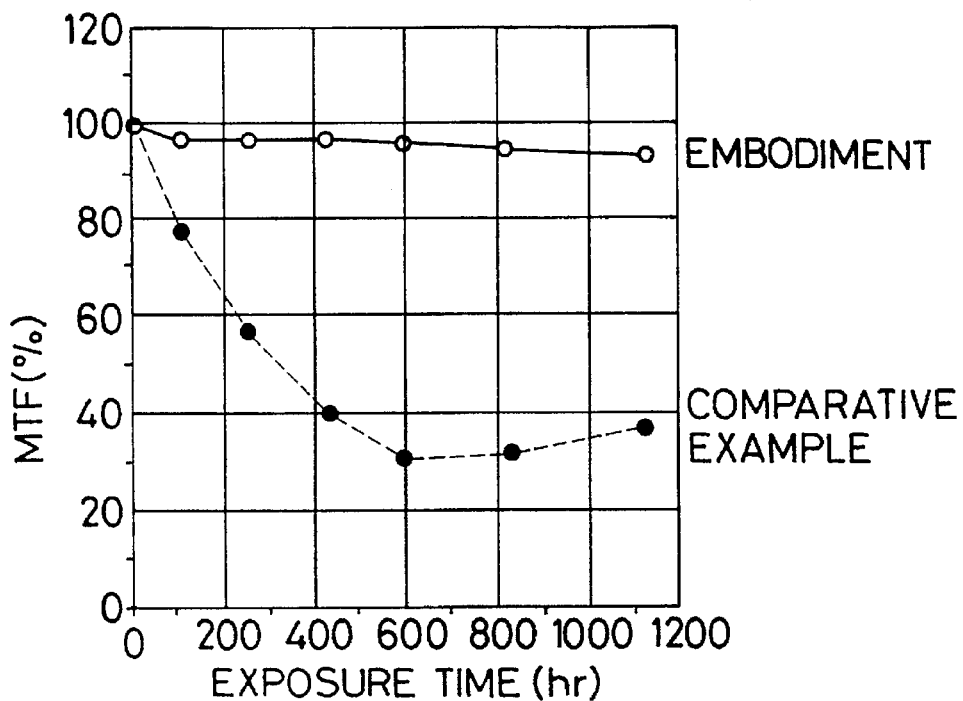
FIG. 16A and FIG. 16B give graphs plotting the results of the exposure of articles according to the present invention and in the prior art to ozone atmosphere, respectively.

For the evaluation of antiozonant property, the lens array unit with the coating layer 9 and uncoated lens array unit for comparison, respectively, were kept in an atmosphere of 40° C., relative humidity 80% and ozone concentration 5 ppm, and their optical performances (resolving power and light transmittance) was measured at intervals of a certain time. The obtained results are plotted in FIGS. 16A and 16B. FIG. 16A shows the change in resolving power, the ordinate exhibiting MTF values expressed in percent when the initial value is taken as 100%.

Figure 16B:
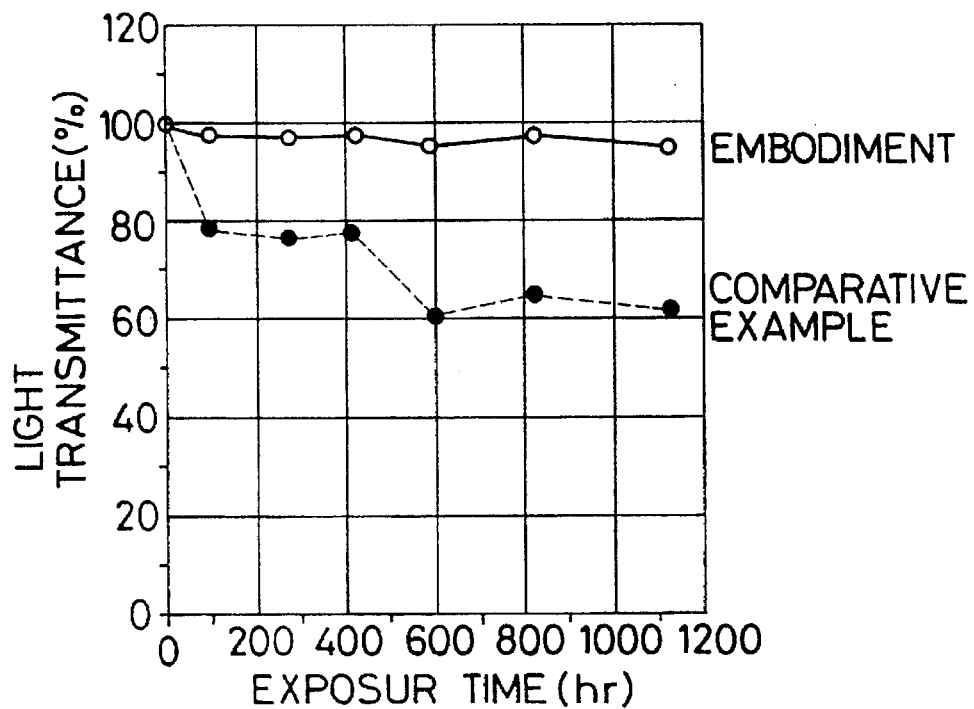

FIG. 16B shows the change in light transmission of the lens, the ordinate exhibiting light transmittance expressed in percent when the initial value is taken as 100%.

In FIGS. 16A and 16B, solid lines are of the lens array of the embodiment of the present invention, and broken lines are of those of the comparative example.

As apparent from the graphs in FIGS. 16A and 16B, likewise in the ozone atmosphere, the optical performance of the lens array unit with the coating layer according to the invention is subjected to deterioration to very small degree with the course of time.

What is claimed is:

1. A smooth-surface optical rod lens array comprising:

a plurality of rod lenses having essentially identical indexes of refraction and substantially equivalent length measured axially from a first rough end surface of each rod to a second rough end surface thereof, the first and second rough end surfaces having a maximum roughness (Rmax) of about 0.5 µm to about 5 µm;

said plurality of rod lenses being positioned in adjoining relationship with the optical axes of said rod lenses being in parallel alignment and with the first rough ends of said rod lenses being arranged to project outwardly in a first direction for introduction of light into said rod lenses and said second rough ends of said rod lenses being arranged to project outwardly in an opposite direction for emergence of said light from said rod lenses;

said rod lenses being formed into an integral rod lens array with a resinous adhesive composition applied to fill any gaps between said adjoining rod lenses and to bond said rod lenses in said position with said rough first and second end surfaces projecting outwardly from opposite ends of said array; and a light-transmitting, solid coating applied on said oppositely projecting end surfaces of said rod lens array in a manner such that said rough first and second end surfaces are filled with said coating and said outwardly projecting surfaces are uniformly smooth without requiring polishing or grinding of the resulting coated end surfaces.

2. The smooth-surface optical part of claim 1 wherein the substrate comprises a solid selected from the group consisting of plastic, glass, and light-transmitting ceramics.

3. The smooth-surface optical part of claim 1 wherein the coating comprises a member selected from the group consisting of thermosetting silicon hard coatings, UV-setting resins, cold-setting two part system epoxy resins, light-setting epoxy acrylates, and sol-gel glasses.

4. The smooth-surface optical part of claim 1 wherein the coating comprises a hydrolysis/polycondensation product of an organometallic compound having a formula represented by $R_1M_1(OR_2)_m$ wherein $R_1$ and $R_2$ are organic groups having 1 to 6 carbon atoms, $M_1$ is a metal, and m is a natural number.

5. The smooth-surface optical part of claim 1 wherein the coating comprises a polycondensation composite product of an organometallic compound having a formula represented by $R_1M_1(OR_2)_m$ wherein $R_1$ and $R_2$ are organic groups having 1 to 6 carbon atoms, $M_1$ is a metal, and m is a natural number, and of at least one organometallic compound having a formula represented by $R_3M_2(OR_4)_m$ or $M_3(OR_5)_n$ wherein $R_3$, $R_4$ and $R_5$ are organic groups having 1 to 6 carbon atoms, $M_2$ and $M_3$ are metals, and n is a natural number.

6. The smooth-surface optical part of claim 5 wherein the organometallic compounds contain titanium or silicon.

7. The smooth-surface optical rod lens array of claim 1 wherein the rod lenses are glass.

8. The smooth-surface optical rod lens array of claim 1 wherein the rod lenses are plastic.

9. The smooth-surface optical rod lens array of claim 1 wherein the light-transmitting, solid coating has a refractive index substantially identical to that of the rod lenses.

10. The smooth-surface optical rod lens array of claim 1 wherein the solid coating has a thickness of about 0.5 µm to about 10 µm.

11. A method of forming a smooth-surface optical rod lens array comprising:

positioning a plurality of prolonged rod lenses having essentially identical indexes of refraction in adjoining relationship, with the optical axes of said prolonged rod lenses being in parallel alignment;

forming said prolonged rod lenses into an integral prolonged rod lens array by applying a resinous adhesive composition to fill any gaps between said adjoining prolonged rod lenses and to bond said prolonged rod lenses in said position;

cutting said integral prolonged rod lens array into a plurality of rod lens arrays having predetermined lengths along their optical axes and having a first rough end surface and a second rough end surface, said first and second rough end surfaces having a maximum roughness (Rmax) of about 0.5 µm to about 5 µm; and applying a light-transmitting, solid coating on said first and second rough end surfaces of said rod lens arrays to form a uniformly smooth surface on each of said first and second end surfaces without requiring polishing or grinding of the resulting coated first and second end surfaces.

* * * * *